June 18, 1957  A. A. MONSON  2,796,176
SEWAGE DISPOSAL APPARATUS
Filed Nov. 19, 1952
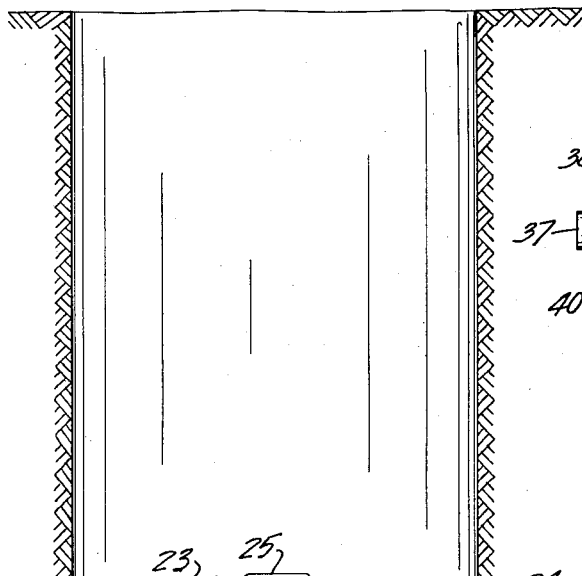
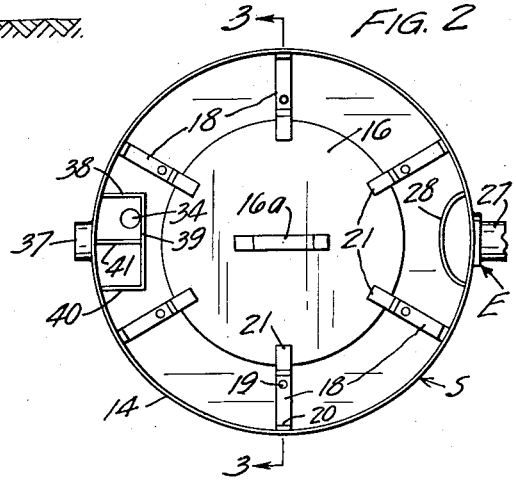
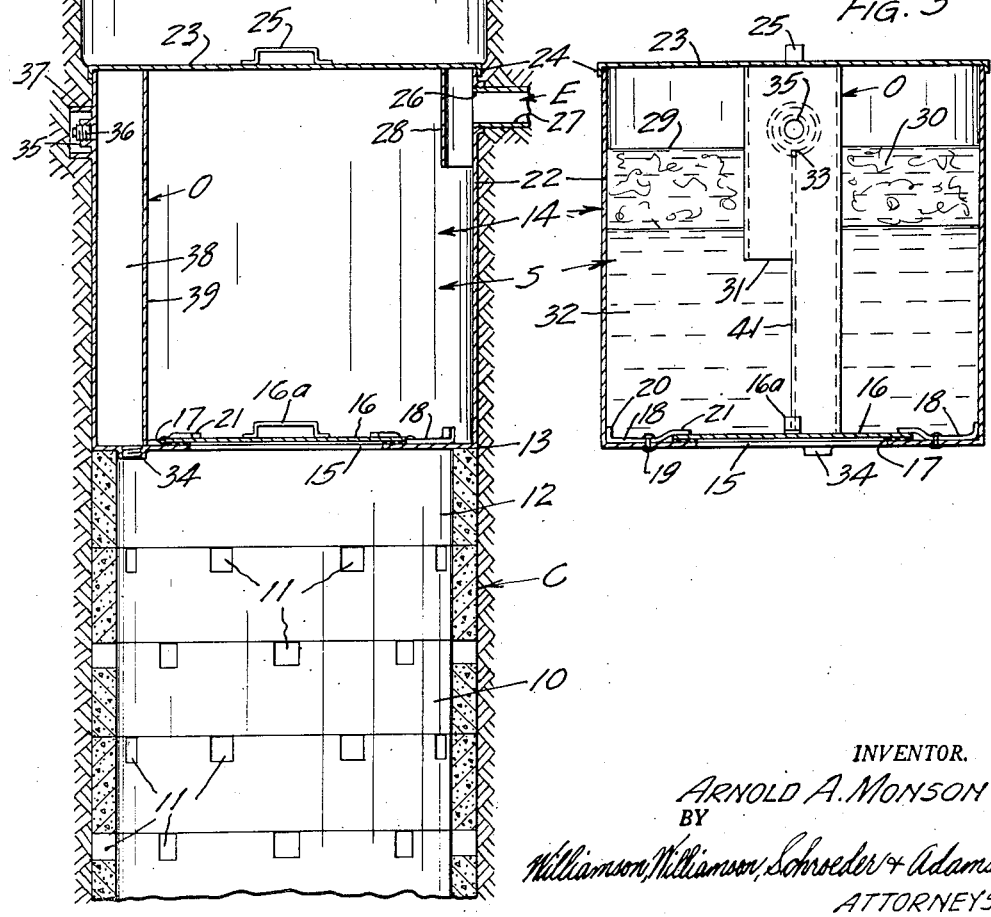
INVENTOR.
ARNOLD A. MONSON
BY
*Williamson, Williamson, Schroeder + Adams*
ATTORNEYS

United States Patent Office 2,796,176
    Patented June 18, 1957

---

2,796,176

SEWAGE DISPOSAL APPARATUS

Arnold A. Monson, Minneapolis, Minn.

Application November 19, 1952, Serial No. 321,365

4 Claims. (Cl. 210—261)

This invention relates to sewage disposal apparatus and more particularly to a novel septic tank which is adapted to be used in close cooperation with a cesspool structure.

It has been the common practice for many years to install cesspools for the disposal of sewage in connection with homes and buildings not having the benefit of public sewage systems. The cesspool is generally formed of sectional material such as concrete blocks into a hollow structure which extends downwardly into the ground during or after excavation of a hole therein. It is almost imperative that the excavation be deep enough to find a porous soil strata such as shale or gravel and at least a portion of the cesspool should extend thereinto. The wall structure has numerous openings therethrough for allowing water to permeate into the soil leaving behind the solids. Many such sewage disposal units have another apparatus in conjunction therewith called a septic tank. The object of the septic tank is to preliminarily treat the raw sewage by bacterial action so as to further liquify much of the sewage and to oxidize a portion of the solids to reduce the bulk of the non-liquid remainder and thereby lengthening the periods between clean-out times. The septic tank is usually placed in tandem with the cesspool, being likewise disposed in an excavation and having its outlet leading downwardly to the adjoining cesspool. In such arrangement it will be noted that two excavations are required as well as a trench for soil pipe leading from the septic tank to the cesspool. When cleaning out either the septic tank or the cesspool it is necessary to remove overburden from the top of each unit in order to gain access thereto. Furthermore, where sewage disposal trouble has developed it is often impossible to tell which of the septic tank or cesspool has become clogged or otherwise rendered inoperative. It is therefore a general object of this invention to provide for an improved sewage disposal apparatus comprising an efficient septic tank which can be easily mounted directly on top of a cesspool structure to form an economical and permanent installation in but a single excavation. The excavation as practiced in my invention must usually be deeper than either of the conventional excavations but this is often an asset since the deeper strata of soil is usually the more porous.

More specifically, it is an object of the invention to provide for a septic tank which can be used in tandem with a cesspool in the conventional manner or may be converted to use in a combined structure with a cesspool, the adaptation being simple and cheap to accomplish.

Another object of the invention is to provide for a septic tank to be mounted over an ordinary cesspool, the septic tank having an outlet leading directly therefrom into the top of the cesspool and arranged so as to preserve the sludge level in the septic tank.

It is a further object of the invention to provide for a combined septic tank and cesspool arrangement which can be jointly installed and which can subsequently be cleaned in a single operation by removing over-burden from one point and gaining access thereby to both the septic tank and cesspool.

These and other objects and advantages of my invention will more fully appear from the following description made in connection with the accompanying drawings wherein like reference characters refer to the same or similar parts throughout the several views and in which:

Fig. 1 is a vertical sectional view of my septic tank in cooperation with a cesspool structure, the latter structure being of conventional form with the lower portions cut away;

Fig. 2 is a top view of the septic tank with the cover thereof removed; and

Fig. 3 is a vertical section of the septic tank taken on the line 3—3 of Fig. 2 and showing stratified sewage at constant level maintained therein.

Referring now more particularly to the drawing, a cesspool structure is indicated generally by C in Fig. 1. This structure may be formed of circular concrete units 10 having openings 11 formed in the upper peripheral surface of each unit. These units may be placed one on the other with the top at approximately ground level during the excavation process, the lowermost unit and those resting upon it continuously sinking down to shield the excavation as it progresses downwardly. A cap unit 12 is placed upon the cesspool structure and the excavation is usually continued until the top 13 of the cesspool structure C has progressed a distance of five or six feet beneath the ground. In some instances it is necessary to go deeper in order to reach porous soil or in order to allow for proper inclination of the soil pipe from the sewage source to the cesspool. In most conventional individual sewage systems a septic tank (not shown) is similarly placed in another excavation with its top at a level with the top of the cesspool. A trench is then dug interconnecting the excavations and soil pipe is laid from the septic tank outlet to the top of the cesspool structure. Both units are then covered with overburden, placed thereover in order to conceal the units and to prevent freezing in cold climates.

My invention contemplates the excavating and construction of an ordinary cesspool structure C with the only difference in the cesspool structure being perhaps a slightly lower excavation and the deletion of the ordinary cesspool cover. An embodiment of the septic tank structure S in my invention contemplates a receptacle 14 having substantially the same outside cross sectional dimensions as that of the cesspool structure C. The receptacle 14 is open topped and water-tight having a large opening or manhole 15 at the bottom and a removable manhole cover 16 in sealed engagement therewith. A water-tight gasket 17 may be interposed between the cover 16 and the periphery of the manhole 15. Latch means such as swingable detents 18 are pivotally mounted at 19, having an upstanding portion 20 at the outer end of each detent 18 and a forward extension 21 for engaging the cover 16 and pressing it downwardly against seal 17 and the periphery of manhole 15. The cover 16 may have a handle 16a for easy manipulation. It is understood that the cover 16 may be removed from the septic tank and that the excavation may be continued as previously noted with septic tank S in position upon the top concrete unit 12, the entire apparatus sinking downwardly as the excavation proceeds at the bottom. It is understood, of course, that the manhole 15 is large enough to accommodate the body of a worker as well as tools and equipment.

The receptacle 14 has side walls 22 extending upwardly to terminate in an opening over which a removable cover 23 may be placed. The cover 23 is preferably equipped with a peripheral flange 24 for encircling the wall 22 and may have a handle 25 to facilitate the removal and replacement thereof.

In an upper position on the receptacle 14 is an entrance structure E, the structure being preferably mounted through the side wall 22 and comprising an inlet 26 which cooperates with the raw sewage soil pipe 27 and a shield member 28 mounted in spaced relation with the inlet 26 at the inner surface of wall 22 for preventing undue agitation of the raw sewage disposed at constant level within the receptacle 14 as shown in detail in Fig. 3.

Within the receptacle 14 is disposed also an exit structure O which amounts to a sludge retaining and fluid releasing element. The structure O has a passageway beginning at a point intermediate the top level 29 of the sewage sludge layer 30 and the bottom of the tank, the inlet 31 thereof being normally immersed in the liquid sewage layer 32. The passageway of exit structure O then proceeds upwardly to point 33 then over and downwardly to terminate at an opening 34 at the bottom of the septic tank S. An alternative opening 35 is formed through the wall 22 of receptacle 14 just above the point 33 where the passageway is reversely formed. The outlet 35 is equipped with a plug member 36 as shown in Fig. 1 when the septic tank S is used in conjunction with the cesspool structure C, the outlet 34 then remaining open. If the septic tank S is to be used in tandem with the cesspool structure C, then the plug 36 will be removed from outlet 35 and placed in outlet 34, a conduit of soil pipe (not shown) then being interposed between the flange 37 around outlet 35 and interconnecting with the separately disposed cesspool C. In the sludge retaining and fluid releasing element O, I prefer to form the entire structure with flat sides 38, 39 and 40 as shown in Fig. 2. The side 41 is coextensive with the side 38, forming a water-tight passageway for the length of the side walls 22 and communicating with the opening 34 in the bottom of receptacle 14. The walls 40, 39 and a portion of the wall 41 terminate in inlet 31 as previously described, the passageway therethrough being water-tight above the inlet point. The wall 41 terminates at point 33 short of the plane defining the top of the septic tank S.

In the use and operation of my sewage disposal apparatus, raw sewage is introduced through the soil pipe 27, striking the shield 28 and filling the receptacle 14 to the level 29 as shown in Fig. 3. It is understood that the manhole cover 16 has been secured in sealed engagement with the bottom of receptacle 14 to form a water-tight container. Bacterial action upon the sewage will cause a stratification therein, an upper sludge layer 30 rising to the top and a liquid layer 32 remaining below. All insoluble particles will, of course, sink to the bottom and over a period of time will accumulate to a point requiring removal. The inlet 31 of the sludge retaining and fluid releasing element O normally lies within the liquid layer 32 and hence the liquid will rise within the passageway to the level 29 of the sewage in receptacle 14. With the plug 36 in position as shown in Fig. 1, the liquid will then overflow the baffle or wall 41 at its uppermost point 33 and will flow downwardly through the passageway and out the opening 34 which leads to the inside of the cesspool structure C as shown in Fig. 1. The level will at all times be maintained at 29 with the sludge layer 30 being retained and only the liquid from layer 32 entering the structure O at 31. Bacterial action upon the sludge layer 30 will prevent the material therein from accumulating and clogging the system. Some of the solid material in the sludge layer 30 will be liquified by bacterial action and another portion will be oxidized to form gaseous products which will escape from the system. As more sewage is fed through conduit 27 an equivalent amount of liquid from the layer 32 will be displaced and flow into the cesspool C. When it is desired to clean out the sewage disposal apparatus the overburden need be removed from but one excavation as shown in Fig. 1 especially the cover 23 for the septic tank S. This cover can then be removed and the septic tank cleaned out. Following this the manhole cover 16 may be simply removed and the cesspool C then cleaned out. Following the cleaning operation, the manhole cover 16 may be replaced and the septic cover 23 replaced followed by refilling with overburden the upper portion of the single excavation to complete the job.

My septic tank S has another application in conventional use wherein the plug 36 is removed from the outlet 35 and placed in the outlet 34. In such instance the downwardly extending passageway which communicates with the outlet 34 is not used at all nor is the manhole 15 utilized. The septic tank S in this instance performs its ordinary function allowing the liquid from layer 32 to pass out from the outlet 35 into its tandem connection with the conventional cesspool.

It may thus be seen that I have devised a novel septic tank for use either as a conventional device or in close cooperation with an ordinary cesspool structure, the latter cooperative use resulting in an apparatus requiring but a single excavation and having the advantage of quick and cheap installation and maintenance.

It will, of course, be understood that various changes may be made in the form, details, arrangement and proportions of the parts without departing from the scope of my invention.

What I claim is:

1. A unitary sewage disposal apparatus adapted to be installed in but a single excavation, said apparatus comprising, a generally elongated hollow structure having a peripheral upstanding side wall extending from the bottom to the top thereof, said wall being provided with a plurality of leaching apertures at the lower portion thereof, a removable closure over the top of said hollow structure, an entrance adapted to admit raw sewage into said hollow structure adjacent the top thereof, a water-tight divider plate traversing the hollow structure medially of its ends below the sewage entrance and above said plurality of apertures, and means providing an elongated exit passageway having its inlet beginning within the hollow structure above said divider plate and thence extending upwardly and over to define the top level of sewage, then downwardly to terminate within the hollow structure below said divider plate for discharging effluent liquid to the lower portion of said hollow structure.

2. The invention according to claim 1, wherein the said divider plate embodies an opening closed by a removable water-tight cover whereby access may be had to the lower portion of the hollow structure below the divider plate.

3. The invention according to claim 1, wherein a portion of the said peripheral side wall above said divider plate is common to the said exit passageway.

4. The invention according to claim 1, wherein the top end of said exit passageway is closed by said removable closure.

References Cited in the file of this patent

UNITED STATES PATENTS

| | | |
|---|---|---|
| 1,102,674 | Lawrence | July 7, 1914 |
| 1,204,462 | Lawrence | Nov. 14, 1916 |
| 1,401,182 | Overton | Dec. 27, 1921 |
| 1,574,603 | Burtis | Feb. 23, 1926 |
| 1,695,217 | Thurell | Dec. 11, 1928 |
| 1,695,443 | Studley | Dec. 18, 1928 |
| 2,069,058 | Davis | Jan. 26, 1937 |